United States Patent [19]

Dauphin

[11] Patent Number: 5,085,569
[45] Date of Patent: Feb. 4, 1992

[54] DEVICE FOR RECOVERING, BY MELTING, THE METAL CONSTITUTING A FUSIBLE CORE

[75] Inventor: Yves Dauphin, Brussels, Belgium

[73] Assignee: Solvay & Cie (Société Anonyme), Brussels, Belgium

[21] Appl. No.: 536,344

[22] Filed: Jun. 11, 1990

[30] Foreign Application Priority Data

Jun. 12, 1989 [FR] France ................... 89 07842

[51] Int. Cl.$^5$ ............... B29C 35/02; B29C 71/00; H05B 6/10
[52] U.S. Cl. .................. 425/174.8 R; 219/10.57; 249/62; 264/25
[58] Field of Search .......... 219/10.491, 10.57; 264/25, 317, 334; 373/155-157; 425/174.8 R, 174, 174.4; 249/61, 62, 63

[56] References Cited

U.S. PATENT DOCUMENTS

| | | | |
|---|---|---|---|
| 2,990,602 | 7/1961 | Brandmayr et al. | 264/317 |
| 3,079,643 | 3/1963 | Miller et al. | 264/303 |
| 3,493,994 | 2/1970 | Wersosky et al. | 425/174.8 R |
| 3,775,091 | 11/1973 | Clites et al. | 75/10.14 |
| 3,957,382 | 5/1976 | Greuel, Jr. et al. | 264/317 |
| 4,432,093 | 2/1984 | Reboux | 373/157 |
| 4,464,324 | 8/1984 | Hager | 264/221 |
| 4,471,488 | 9/1984 | Reboux | 373/153 |
| 4,615,855 | 10/1986 | Orlowski et al. | 264/317 |
| 4,666,681 | 5/1987 | Ferrand et al. | 373/157 |
| 4,838,933 | 6/1989 | Paillere et al. | 373/157 |
| 4,952,346 | 8/1990 | Gravelle | 264/317 |

FOREIGN PATENT DOCUMENTS

1162096 9/1958 France .
63-227310 9/1988 Japan .
1250476 10/1971 United Kingdom .

Primary Examiner—Jay H. Woo
Assistant Examiner—James P. Mackey
Attorney, Agent, or Firm—Spencer & Frank

[57] ABSTRACT

The device which is used for recovering a fusible core employed for moulding a hollow plastic article includes a bath of a liquid heated to a temperature at least equal to the melting temperature of the metal constituting the fusible core, a handling mechanism for introducing and holding the hollow article in this bath and a mechanism for heating, using electrical induction, the fusible core of the hollow article, the liquid bath being contained in a leakproof enclosure (1) made of an electrically non-conductive material which withstands the temperature of the bath and the mechanism of heating using electrical induction (4) being arranged outside and around the enclosure (1).

5 Claims, 1 Drawing Sheet

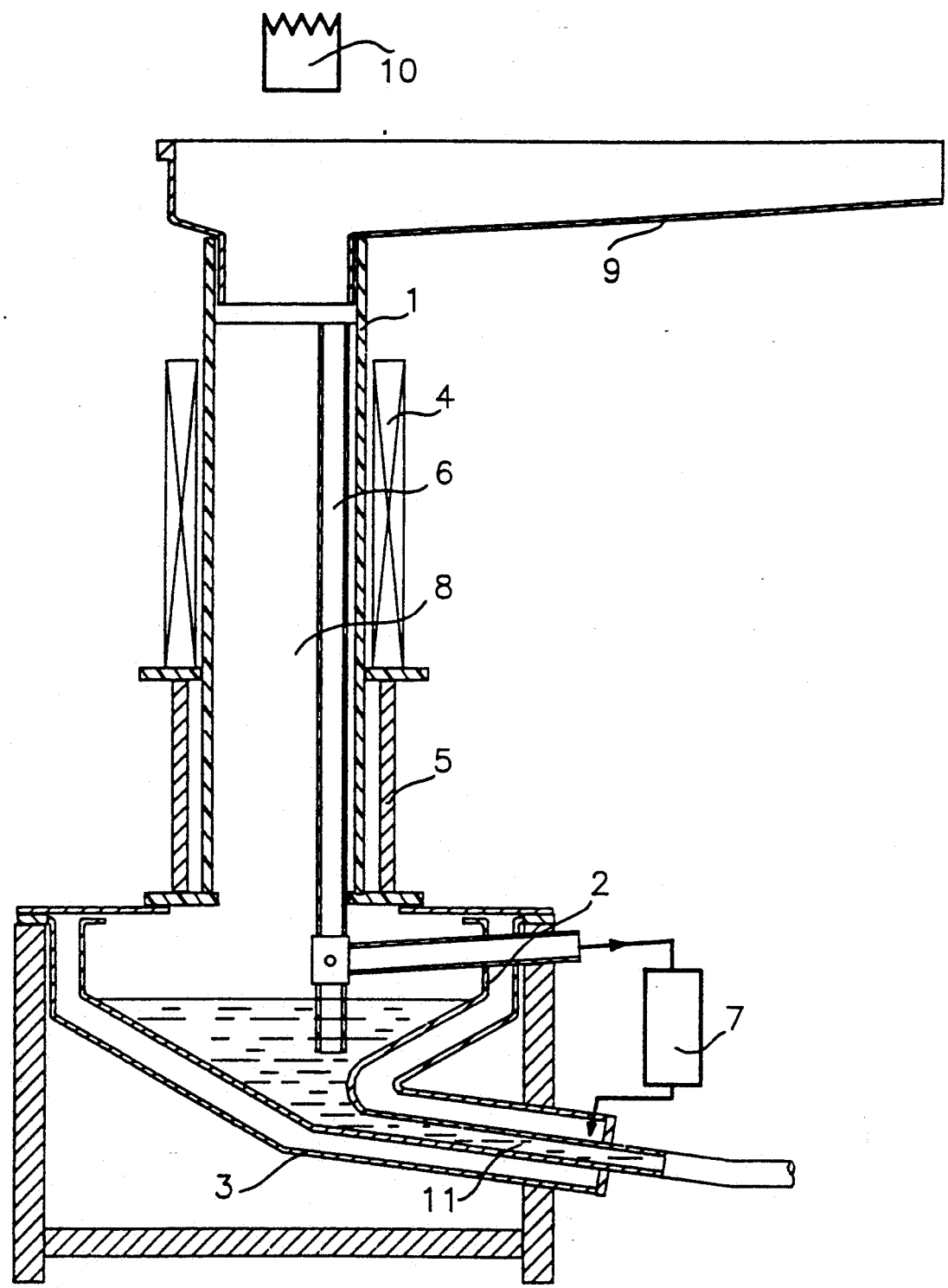

DEVICE FOR RECOVERING, BY MELTING, THE METAL CONSTITUTING A FUSIBLE CORE

FIELD OF THE INVENTION

The present invention relates to a particular device for the recovery, by melting, of the metal constituting a fusible core.

TECHNOLOGY REVIEW

To produce hollow thermoplastic articles, especially by injection moulding, it is known to resort to the moulding technique using a fusible core. According to this technique, which is disclosed especially in patent FR-A-1,162,096, a fusible core corresponding to the hollow part of the desired article is judiciously placed in the injection mould and the injection of the molten thermoplastic is carried out into the mould thus fitted out. After moulding, the fusible core must then be removed, generally by melting, finally to obtain the desired moulded hollow article.

According to a first technique, which is furthermore referred to in the abovementioned patent, it is possible, for this purpose, to immerse the moulded article in a bath containing a hot liquid such as oil heated and maintained at a temperature which is at least equal to the melting temperature of the material constituting the core. However, this technique requires a relatively long time because the heat must be transmitted to the core through the wall of the article and hence through a poorly heat-conductive thermoplastic material. In addition, this technique makes it necessary to resort to fusible cores with a melting temperature markedly lower than that of the thermoplastic constituting the article, and this can pose problems during the injection moulding.

According to a second technique, disclosed especially in patent GB-A-1,250,476 and in patent application JA-A-63-227,310, the fusible core can be removed by inserting the moulded article into a heating coil using electrical induction. This technique offers the advantage that the heat of melting of the core is generated directly within the latter and thus enables the core to melt faster.

In this technique necessary precautions must nevertheless be taken to avoid any accidental spilling of molten metal onto the induction coil and consequently any risk of short circuit. In addition, the Applicant has found that the core melted firstly at the surface as a result of the skin effect and did so particularly in the parts of large cross-sections normal to the induction field and, after melting of the surface regions, the induction heating dramatically ceased to be effective because, at this time, the remaining metal cross-sections to be melted were thin. Consequently, therefore, this second technique is not suitable for removing the last traces of the fusible core and, as a result, the moulded articles produced may still contain residual metal particles originating from an incomplete removal of the fusible core.

Furthermore, in patent US-A-4,464,324, a technique for removing a fusible core was proposed, which consists in immersing the moulded article in a bath of hot liquid, it being possible for the fusible core to be equipped with electrical resistors which are connected to a source of electrical current. In this way, the electrical current permits a rapid melting of the major central part of the core and the hot bath assists in causing the melting of the last solid particles of the core. However, this technique requires the production of special and costly fusible cores, since they are equipped with electrical resistors.

SUMMARY OF THE INVENTION

The Applicant has now developed a device for the complete removal of a fusible core employed for moulding a hollow article, which is found to be highly effective and which does not require the production of special fusible cores.

The present invention consequently relates to a device for the recovery, by melting, of the metal constituting a fusible core employed for moulding a hollow plastic article, comprising a bath of a liquid heated to a temperature at least equal to the melting temperature of the said metal, means for introducing and holding the hollow article in this bath and means for heating, using electrical induction, the fusible core of the hollow article immersed in the bath, characterized in that the bath is contained in a leakproof enclosure made of an electrically nonconductive material which withstands the temperature of the bath and in that the means of heating using electrical induction are arranged outside and around the said enclosure.

BRIEF DESCRIPTION OF THE DRAWING

The Figure illustrates an apparatus for recovery, by melting of metal constituting a fusible core, diagrammatically and in cross-section.

DETAILED DESCRIPTION OF THE INVENTION

The device in accordance with the invention consequently allows a simultaneous use of heating using a hot liquid and of heating using electrical induction, and does so in optimum conditions.

In fact, since the means of heating using electrical induction are situated outside the enclosure, they are easily accessible, for example for possible repair, and controlling its operation is made easier. In addition, cooling of the means of heating using electrical induction is made easier. Thus, this cooling can be ensured using water without any risk of a leakage into the hot bath and without simultaneous and undesirable cooling of the liquid bath. Furthermore, the risks of fouling the turns of the electrical heating means during the flowing of the molten metal constituting the fusible core are eliminated. Lastly, the use of a means of heating situated outside the bath permits the use of a leakproof enclosure of smaller capacity and hence bulk, and consequently the use of a volume of heating liquid which is also smaller.

Furthermore, in the device in accordance with the invention the heating using electrical induction causes rapid melting of the core, starting at its surface and in the regions of largest cross-sections normal to the induction field and consequently the flow of the molten metal in these regions, which allows the hot liquid of the bath to enter the space thus released between the injected article and what remains of the core, which facilitates the melting of the last solid traces of the fusible core when the heating using electrical induction becomes less effective.

To produce the leakproof enclosure for the liquid bath a material is preferably chosen which is electrically nonconductive and capable of withstanding the liquid bath at temperatures of between 100 and 250° C.

By way of such materials there may be mentioned especially:

glasses and ceramics, thermoset resins optionally filled with glass or with inorganic material, such as epoxy resins, polyester resins, phenolic resins and melamine-based resins, thermoplastic resins of high melting point, such as fluoropolymers like polyvinylidene fluoride, polyetherketone(s), polyetherimides, and the like.

The means of heating using electrical induction generally consist of a coil surrounding the enclosure, which is fed with a high-frequency current of 400 to 20,000 Hz at a nominal power of 100 to 250 kW. When the device in accordance with the invention is produced it is appropriate to avoid the presence of any metal component at a distance of less than 30 cm and preferably less than 40 cm from the coil, because this component would run the risk of being unduly heated under the effect of the heating using electrical induction.

Among the various liquids which may be employed, there may be mentioned especially:

mineral or synthetic heating oils such as, in particular, mixtures of dibenzyltoluene isomers, polypropylene glycols of sufficiently high molecular mass to avoid an excessive evaporation, modified aliphatic polyalcohols, molten salt baths at high temperature, such as baths in the form of mixtures of nitrates and nitrites.

It is obviously appropriate to make sure of the compatibility of the chosen liquid with the materials present (tank and treated articles) and of the possibilities of subsequent washing of the treated articles.

To produce the means for introducing and holding the hollow article in the bath of the device in accordance with the invention it is obviously appropriate to employ materials which are electrically nonconductive and which withstand the temperature of the bath. For this purpose it is possible in particular to employ the same materials as for the production of the leakproof enclosure. The entry of the hollow article to be treated in the bath of the device may be performed as a continuous or sequential movement. In particular, when the fusible core has a part of smaller cross-section normal to the induction field, it may be advantageous to introduce this part first into the bath and into the induction field and only then the parts of larger cross-section.

It has been ascertained, furthermore, that the effectiveness of the device in accordance with the invention can be improved further by equipping the means for introducing and holding the hollow article in the liquid bath with a system capable of ensuring an application of vibration to the hollow article. To this end, it is possible to employ any type of vibrator such as, for example, an a synchronous motor equipped with an unbalanced mass. The preferred vibration frequencies are between 2 and 100 Hz. It has been ascertained, in fact, that the effect of these vibrations is to promote the flow of the fusible core, molten or even still solid, out of the hollow article, to avoid any local adhesion between the hollow article and any part of the fusible core and to reduce any risk of overheating the material constituting the fusible core. It has further been ascertained that it is unnecessary to subject the hollow article to vibrations as soon as it enters the liquid bath but, on the contrary, that this application of vibration to the hollow article can advantageously be delayed by 1 to 20 seconds in time relative to the beginning of the heating using electrical induction. Furthermore, it is advantageous to maintain this application of vibration while the hollow article is withdrawn from the liquid bath after complete melting of the fusible core, so as to facilitate the flow of the last traces of molten metal of the fusible core and of the heating liquid constituting the bath, out of the hollow article.

The device in accordance with the invention is, furthermore, explained in more detail in the description of a particular embodiment, which is to follow. In this description reference will be made to the single figure of the attached drawing, which shows the device for recovery diagrammatically and in cross-section.

As is apparent from the figure, the device consists essentially of a vertical cylindrical vessel (1) made of epoxy resin reinforced with a glass fibre cloth (marketed under the trademark EPOGLASS 11 by the company Isolants Victor Hallet S.A.), which is connected at its base to a metal collector (2) consisting of a funnel arranged in a metal enclosure (3). A coil for heating using electrical induction (4) is held around the upper part of the cylindrical vessel (4) by a support (5) so that the lower part of the coil is situated at least 40 cm from the metal collector (2). The cylindrical vessel (1) is internally equipped with an overflow pipe (6) made of a material identical with that employed for producing the cylindrical vessel (1). The overflow pipe is connected at its base to a device for heat conditioning (7) of the liquid, in this case a modified aliphatic polyalcohol produced and marketed by the company Badische Anilin- und Soda-Fabrik under the trademark LUTRON, constituting the bath (8) into which the hollow article to be treated is to be introduced and held. The outlet of the heat-conditioning device (7) is connected to the metal enclosure (3). The upper part of the cylindrical vessel (1) is equipped with a gutter (9) made of electrically nonconductive plastic.

When brought into service, the device just described is filled with a mineral oil kept at a temperature at least equal to the melting temperature of the metal constituting the fusible core of the hollow articles to be treated, the upper level of this oil in the cylindrical vessel (1) being fixed by the upper end of the overflow pipe (6). In fact, the oil enters the device through the enclosure (3), overflows into the collector (2), fills the cylindrical vessel (1) up to the level fixed by the upper end of the overflow pipe (6) and returns through this overflow pipe (6) to the heat conditioning device (7), to be again reintroduced into the device through the enclosure (3) following a continuous circulation.

In addition, the device is supplemented by handling means (10), shown diagrammatically, whose function is to convey the hollow articles to be treated into the cylindrical vessel (1) and to withdraw them from this vessel after treatment. The parts of these handling means (10) which are called upon to enter the cylindrical vessel (1) are made of an electrically nonconductive material which withstands the temperature of the mineral oil present in the cylindrical vessel (1). The handling means (10) which generally consist of a robot equipped with a suitable grab are, furthermore, equipped with a system—not shown—capable of ensuring an application of vibration to the article to be treated.

The operating cycle of the device thus described is the following, the device being assumed to be in an operating regime.

A hollow article to be treated is brought by the handling means (10) into the cylindrical vessel (1) and is immersed in the hot mineral oil held in this vessel. During this entry of the hollow article, the coil (4) is brought into service so as to melt the fusible core from its surface so that, on flowing out, it permits the flow of the hot mineral oil and consequently the complete melting of the fusible core. The molten metal flows under gravity through the cylindrical vessel (1) and accumulates in the metal collector (2). The molten metal can then be drawn off from the collector through a discharge nozzle (11) and can be reemployed for the production of a new fusible core.

To make the treatment of the hollow article held in the cylindrical vessel easier it is found very useful to apply vibration to the treated article by means of the system fitted to the handling means.

When the treatment of the hollow article is finished, the coil (4) is switched off and the article is withdrawn from the cylindrical vessel (1). During the withdrawal of the treated article from the cylindrical vessel (1) it is advantageous to keep this article vibrating to rid it of the hot mineral oil which adheres to its walls, this oil being recovered by the gutter (9) and reintroduced into the cylindrical vessel (1).

I claim:

1. A device for recovery, by melting, of metal constituting a fusible core employed for moulding a hollow plastic article, comprising a bath of a liquid heated to a temperature at least equal to the melting temperature of said metal, means for introducing and holding the hollow article in said bath and means for heating, using electrical induction, the fusible core of the hollow article immersed in the bath, said bath being contained in a leakproof enclosure made of an electrically nonconductive material which withstands the temperature of the bath and said means of heating suing electrical induction being arranged outside and around said enclosure.

2. The device according to claim 1, wherein the means for holding the hollow article in the liquid bath are equipped with means to vibrate the hollow article held in the bath.

3. The device according to claim 1, wherein the leakproof enclosure is made of a thermoset plastic.

4. The device according to claim 1, wherein the leakproof enclosure is made of glass.

5. The device according to claim 1, wherein the means for introducing and holding the hollow article in the bath are made of an electrically nonconductive material which withstands the temperature of the bath.

* * * * *